(12) United States Patent
Van De Sande

(10) Patent No.: US 11,427,292 B2
(45) Date of Patent: Aug. 30, 2022

(54) LIFTING SPINDLE ARRANGEMENT FOR A RETRACTABLE THRUSTER UNIT OF A MARINE VESSEL

(71) Applicant: Wärtsilä Netherlands B.V., DM Drunen (NL)

(72) Inventor: Jan Van De Sande, DM Drunen (NL)

(73) Assignee: WARTSILA NETHERLANDS B.V., DM Drunen (NL)

( * ) Notice: Subject to any disclaimer, the term of this patent is extended or adjusted under 35 U.S.C. 154(b) by 58 days.

(21) Appl. No.: 16/439,106

(22) Filed: Jun. 12, 2019

(65) Prior Publication Data

US 2019/0291835 A1     Sep. 26, 2019

Related U.S. Application Data

(63) Continuation of application No. PCT/EP2016/080556, filed on Dec. 12, 2016.

(51) Int. Cl.
 *F16H 25/20* (2006.01)
 *B63H 5/125* (2006.01)
 (Continued)

(52) U.S. Cl.
 CPC ......... *B63H 5/125* (2013.01); *F16H 25/2015* (2013.01); *B63H 2025/425* (2013.01);
 (Continued)

(58) Field of Classification Search
 CPC .............. B63H 5/125; B63H 2025/425; B63H 2025/465; F16H 25/2021; F16H 25/2015;
 (Continued)

(56) References Cited

U.S. PATENT DOCUMENTS 2,927,473 A * 3/1960 James ................. F16H 25/2021
 74/89.23
3,524,526 A * 8/1970 Denkowski ......... F16H 25/2021
 192/141
(Continued)

FOREIGN PATENT DOCUMENTS

DE    1173926 B    7/1964
DE    2355334 A1   1/1975
(Continued)

OTHER PUBLICATIONS

International Search Report (PCT/ISA/210) dated Sep. 7, 2017, by the European Patent Office as the International Searching Authority for International Application No. PCT/EP2016/080556.
(Continued)

*Primary Examiner* — Jake Cook
*Assistant Examiner* — Gregory Robert Weber
(74) *Attorney, Agent, or Firm* — Buchanan Ingersoll & Rooney PC

(57) ABSTRACT

A lifting spindle arrangement is disclosed for a retractable thruster unit of a marine vessel, the lifting spindle having a lower end and an upper end and being supported at its lower end to a lower support structure by a lower support assembly and at its upper end to an upper support structure by an upper support assembly. The lifting spindle is provided at its both ends with a locking member for such a connection to the support structures such that each end of the lifting spindle may freely move in an axial direction away from the opposite end of the lifting spindle.

15 Claims, 5 Drawing Sheets

(51) Int. Cl.
*B63H 25/42* (2006.01)
*B63H 25/46* (2006.01)

(52) U.S. Cl.
CPC .......... *B63H 2025/465* (2013.01); *F16H 2025/2031* (2013.01); *F16H 2025/2037* (2013.01)

(58) Field of Classification Search
CPC ..... F16H 2025/2031; B30B 1/18; F16D 1/06; F16C 29/002
See application file for complete search history.

(56) References Cited

U.S. PATENT DOCUMENTS

| | | | |
|---|---|---|---|
| 3,550,547 A | 12/1970 | Pleuger et al. | |
| 4,466,511 A * | 8/1984 | Garnett | B23Q 11/0092 188/134 |
| 4,727,762 A * | 3/1988 | Hayashi | F16C 19/548 384/517 |
| 5,522,335 A | 6/1996 | Veronesi et al. | |
| 5,761,963 A * | 6/1998 | Hartwig | F16H 25/2021 251/129.12 |
| 5,937,699 A | 8/1999 | Garrec | |
| 6,109,594 A | 8/2000 | Waligora et al. | |
| 6,761,080 B2 * | 7/2004 | Lange | F16H 25/2015 74/424.71 |
| 8,127,912 B2 * | 3/2012 | Lang | B64C 13/34 192/223.3 |
| 8,312,783 B2 * | 11/2012 | McKay | F16H 25/2021 74/89.39 |
| 9,404,562 B2 * | 8/2016 | Oberndorfer | H02K 7/06 |
| 10,005,532 B2 * | 6/2018 | Smith | B63H 5/125 |
| 2008/0047377 A1 | 2/2008 | Becker et al. | |
| 2019/0055009 A1 * | 2/2019 | Ditzler | B64C 25/26 |

FOREIGN PATENT DOCUMENTS

| | | |
|---|---|---|
| DE | 20100671 U1 | 4/2001 |
| FR | 2757585 A1 | 6/1998 |
| WO | 9607513 A1 | 3/1996 |

OTHER PUBLICATIONS

Written Opinion (PCT/ISA/23/) dated Sep. 7, 2017, by the European Patent Office as the International Searching Authority for International Application No. PCT/EP2016/080556.

International Preliminary Report on Patentability (PCT Article 36 and Rule 70) (Form PCT/IPEA/409) dated Mar. 25, 2019, issued by the European Patent Office, in the corresponding International Application No. PCT/EP2016/080556 (26 pages).

\* cited by examiner

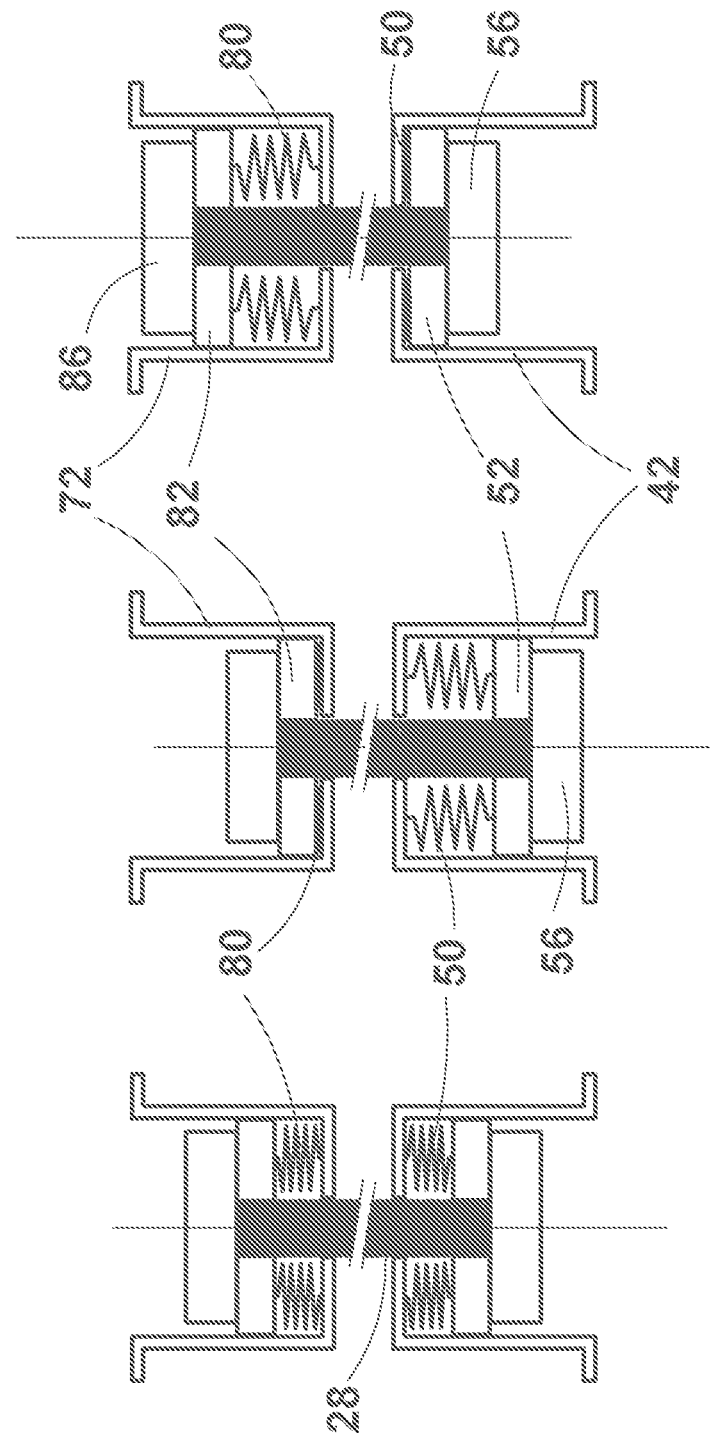

LIFTING SPINDLE ARRANGEMENT FOR A RETRACTABLE THRUSTER UNIT OF A MARINE VESSEL

RELATED APPLICATION

This application claims priority as a continuation application under 35 U.S.C. § 120 to PCT/EP2016/080556 filed as an International Application on Dec. 12, 2016 designating the U.S., the entire content of which is hereby incorporated by reference in its entirety.

FIELD

The present disclosure relates to a lifting spindle arrangement for a retractable thruster unit.

BACKGROUND INFORMATION

Marine vessels use various propulsion systems or units. The main propulsion unit or units can be arranged in the aft part of the ship. The main propulsion unit may be either a fixed propeller arrangement creating a thrust force in the longitudinal direction of the marine vessel, or it may be a pod or a thruster, i.e. a propeller arrangement that may be rotated round a vertical axis.

The marine vessels have also other propulsion arrangements that are mainly used when maneuvering a ship in a port, for instance. One type of such propulsion arrangements is a tunnel thruster, which may be used both at the bow and at the stern of a ship. The tunnel thruster is arranged in a horizontal tunnel running transverse to the longitudinal direction of the marine vessel through the hull of the marine vessel for assisting in moving the entire ship or one end of the ship sideways for instance for docking purposes.

Both the ordinary thrusters and tunnel thrusters have been developed further by making them retractable; i.e. the thruster unit may be kept within the hull when inoperative and it is lowered below the hull, so to be below the baseline of the marine vessel only when the operation thereof is needed. When the thruster unit is in lowered position it may be rotated around a vertical axis, and it may thus be used to generate thrust in any desired direction for steering purposes.

A known retractable thruster is disclosed in U.S. Pat. No. 3,550,547. This document discloses a retractable thruster, which includes an electric motor at its upper end, a motor base provided with at least two arms extending horizontally outside the motor base, a drive shaft extending downwardly from the motor through the motor base down to a pod, a shaft housing provided around the shaft between the motor base and the pod and a lower bearing arrangement arranged to support the shaft housing. The thruster is supported to the hull of the marine vessel by the lower bearing and at least two vertical guide posts arranged to the sides of the shaft housing. The arms of the motor base are provided with slide bearings, which allow the motor base, and the entire thruster therewith, to slide vertically along the guide posts. To move the thruster in a vertical direction at least two hydraulic cylinders are arranged vertically between the hull of the marine vessel and the motor base.

Another example of a known retractable thruster is disclosed in U.S. Pat. No. 5,522,335. This document discloses a thruster corresponding to that of the above U.S. Pat. No. 3,550,547 with the exception that the guide posts and hydraulic cylinders are replaced with two spindles. In other words, the arms of the motor base are provided with a kind of fixed nut through which the power screws or spindles run in vertical direction. By rotating the spindles the thruster is moved either upwards or downwards depending on the direction of rotation.

In view of above it is known that retractable thrusters offer the option of being retracted into the ship's hull when not being used and being deployed beneath the hull when they are to operate. In these type of thrusters various retraction mechanisms, both mechanical and hydraulic, are used. Known hydraulic cylinders that push the thruster upward are used for relatively small thrusters, and threaded spindles that push the thruster upward are used for larger sized thrusters.

Both systems have their pros & cons but also both have proven to be reliable systems in the past.

The hydraulic cylinders are relatively cheap and very reliable, and their system design is simple. However, they use hydraulic power units and routing of pipes, that involve a relatively larger build-in space and have parts in an underwater area which interfere with thruster build-in. They do not scale well when applied to larger thruster sizes, mostly due to increased risk of buckling of the rods of the hydraulic cylinders. And they involve external locking systems and several other additional parts, which add additional cost.

Threaded (pushing) spindles involve only a compact build-in space with no parts in an underwater area and they do not involve any external locking. In their current form they include a hydraulic power unit. However the spindles may be easily converted for electric drive. This is an advantage as electrical steering of thrusters is very much upcoming and rapidly replacing current hydraulic steering systems. However, the use of spindles is expensive due to large diameter threaded spindles, which involve high driving torque. Spindles have to be of large diameter due to buckling loads and guiding loads. They also involve a large reduction gearbox and synchronizing chain due to high drive torque requirements, they are complex to build into vessels.

In view of the above it is clear that the risk of buckling, when using either hydraulic cylinders or spindles, is a problem common to both options and that known solutions have been to use spindles with increasing diameter to such a dimension that buckling is no more a risk. This has resulted in extremely sturdy structures that complicate the handling and installation of the thruster in the hull not to mention the space they need.

When considering the basic properties of both hydraulic cylinders and rotary (or non-rotary) spindles it was learned that they both worked by pushing the thruster unit, which inevitably results in a compressive load in the member performing the actual pushing, and involves the risk of buckling. When studying further the connection between the ends of a spindle and the support structures of the marine vessel to which the spindle is supported, it was learned that even if the spindle, in most instances, was arranged to be rotatable, the connection was, in the longitudinal direction of the spindle, a fixed one. In other words, the connection did not allow any longitudinal or axial movement of the spindle. In practice such a connection means that, while almost always the thruster subjects a force to the spindle, either on its own due to gravity or buoyancy, or as a result of the action of the spindle, the part of the spindle between the thruster and the end of the spindle towards which the force is directed is subjected to compression, and potential risk of buckling.

SUMMARY

A retractable thruster unit for a marine vessel having a hull is disclosed, the retractable thruster unit comprising: a lifting spindle arrangement, the lifting spindle arrangement having a lifting spindle, a lifting nut, and a motor, and having a lower end and an upper end and being supported at its lower end to a lower support structure by a lower support assembly and at its upper end to an upper support structure by means of an upper support assembly, wherein one of the lifting spindle and the lifting nut is fixed and the other is rotatable for moving the retractable thruster unit; and locking members provided at both ends of the lifting spindle, with a lower locking member being configured to freely move in an axial direction downwards from the lower support structure, and an upper locking member being configured to freely move upwards from the upper support structure.

A method of moving a thruster unit in a marine vessel in a vertical direction by one or more lifting spindle arrangements is disclosed, each lifting spindle arrangement having a lifting spindle, a lifting nut cooperating with the lifting spindle, a lower support assembly at a lower end the lifting spindle for connecting the lifting spindle to a lower support structure, an upper support assembly at an upper end the lifting spindle for connecting the lifting spindle to an upper support structure, one of the spindle and the lifting nut being fixed and the other being rotatable, the method comprising: initiating movement of the thruster unit in a direction by rotating one of the spindle and the lifting nut; and allowing a lower locking member to move freely in an axial direction downwards from the lower support structure, and an upper locking member to move freely upwards from the upper support structure.

BRIEF DESCRIPTION OF THE DRAWINGS

In the following, exemplary retractable thruster units of the present disclosure are explained in more detail in reference to the accompanying Figures, of which:

FIGS. 6a-6c illustrate schematically various operating conditions of an exemplary lifting arrangement of the present disclosure.

DETAILED DESCRIPTION

Exemplary embodiments as disclosed herein include a lifting spindle arrangement for a retractable thruster that has no or reduced risk of buckling.

An exemplary retractable thruster unit for a marine vessel having a hull is disclosed with a retractable thruster unit including a lifting spindle arrangement, the lifting spindle arrangement having a lifting spindle, a lifting nut, and a motor, and having a lower end and an upper end and being supported at its lower end to a lower support structure by a lower support assembly and at its upper end to an upper support structure by an upper support assembly, wherein one of the lifting spindle and the lifting nut is fixed and the other one is rotary via the motor provided to rotate one of the lifting spindle and the lifting nut for moving the retractable thruster unit, the lifting spindle being provided at its both ends with locking members such that a lower locking member is able to freely move in an axial direction downwards from the lower support structure, and an upper locking member is able to freely move upwards from the upper support structure.

Exemplary methods of moving a thruster unit in a marine vessel in a vertical direction via one or more lifting spindle arrangements are also disclosed, each lifting spindle arrangement including a lifting spindle, a lifting nut cooperating with the lifting spindle, a lower support assembly at a lower end the lifting spindle for connecting the lifting spindle to a lower support structure, an upper support assembly at an upper end the lifting spindle for connecting the lifting spindle to an upper support structure, one of the spindle and the lifting nut being fixed and the other one being rotary by means for rotating (e.g., a motor) one of the spindle and the lifting nut, the method including:
  initiating movement of the thruster unit by rotating one of the spindle and the lifting nut; and
  allowing the lower locking member to move freely in an axial direction downwards from the lower support structure and the upper locking member to move freely upwards from the upper support structure.

Exemplary embodiments can provide a number of advantages, of which a few are listed in the following:
  Higher loads can be applied to a smaller diameter spindle.
  Compact build-in space with no parts in underwater area.
  No external locking required.
  Driven by electric motor. (Can be converted to hydraulic if requested.)
  Lower cost compared to other systems.
  Easy to build into vessel due to lighter, smaller and simpler components.
  Unlimited movement of the spindle at the ends of the spindle in a direction away from the thruster unit.

However, it should be understood that the listed advantages are exemplary and optional, with varied embodiments offering advantages as desired.

Figure 1:
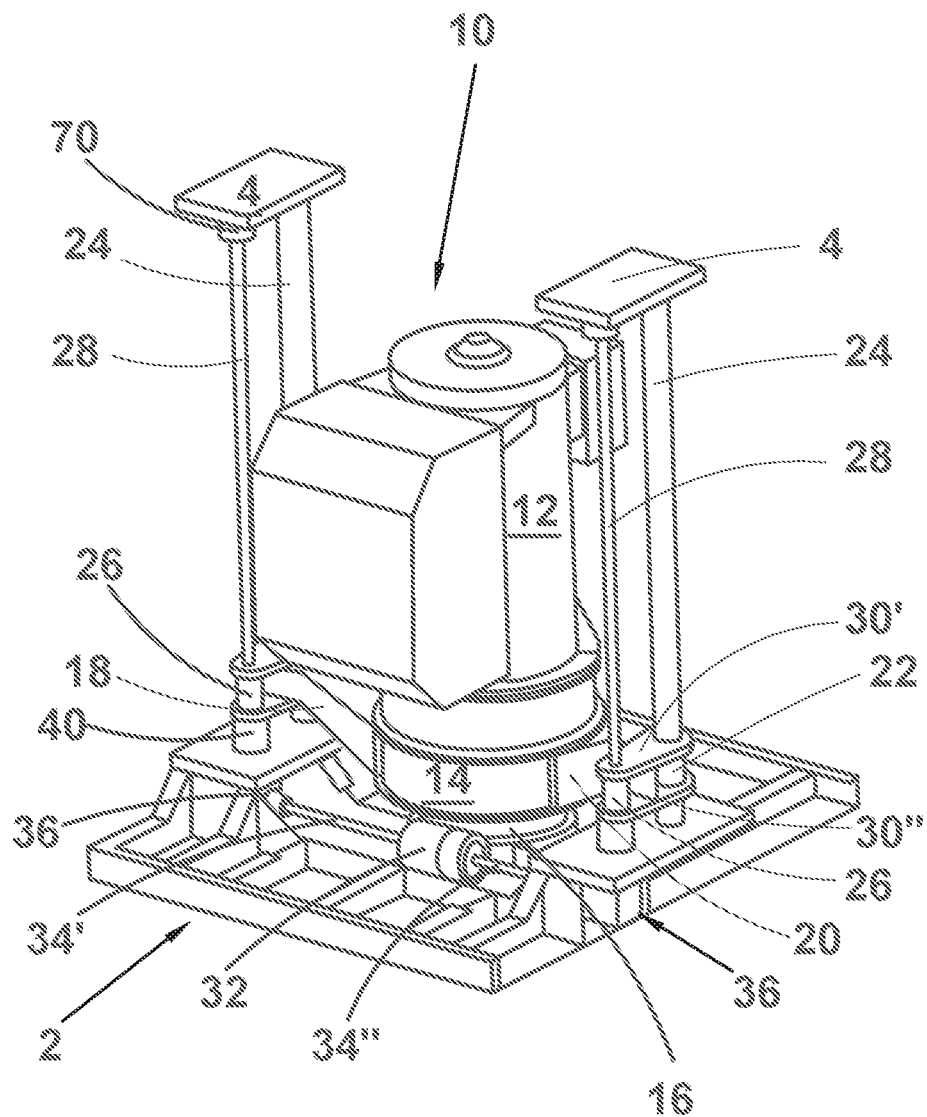
FIG. 1 illustrates an axonometric view of a retractable thruster unit in accordance with an exemplary embodiment of the present disclosure.
Figure 2:
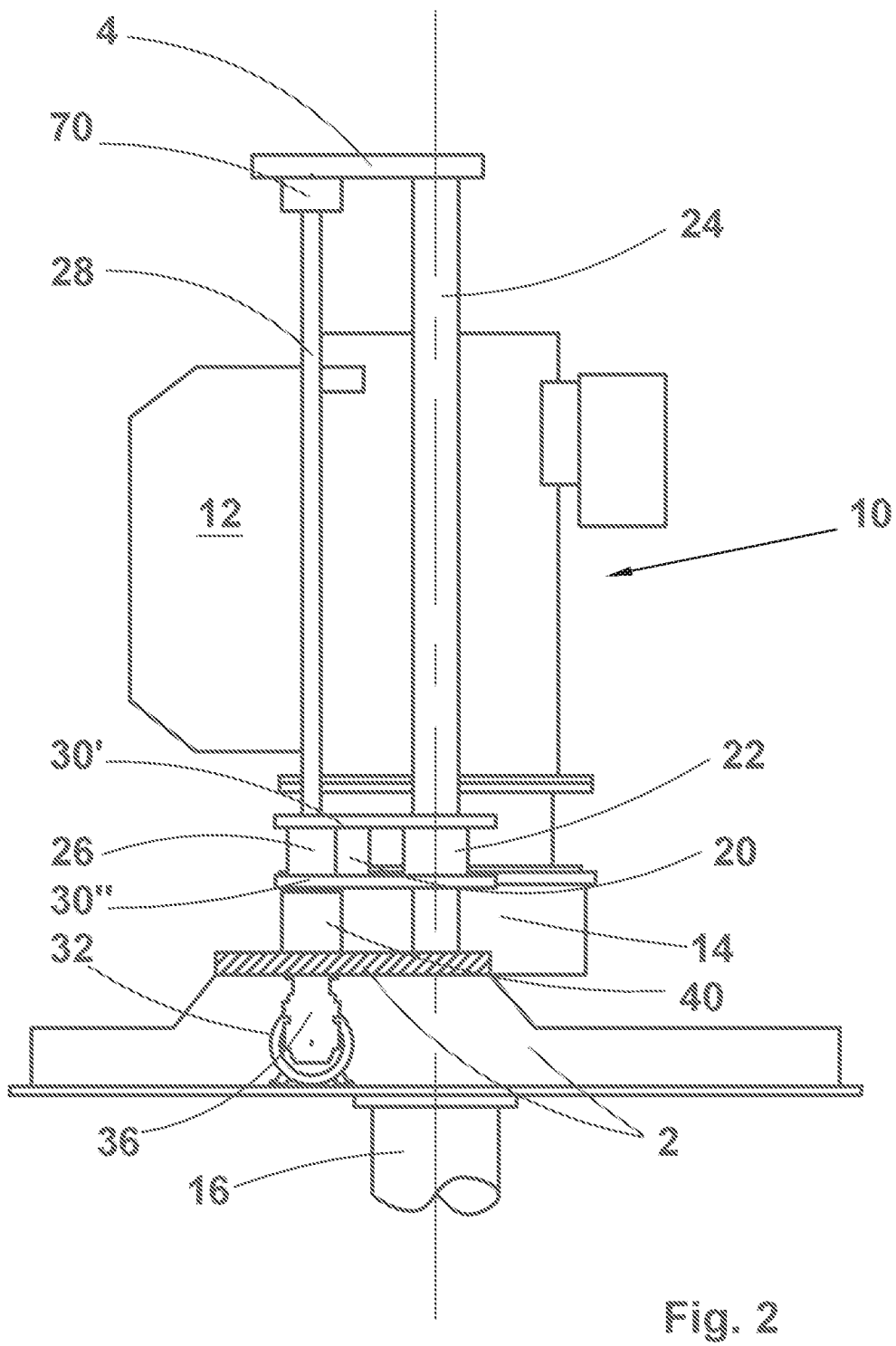
FIG. 2 illustrates a vertical side view of an exemplary retractable thruster unit of FIG. 1.

FIG. 1 illustrates an axonometric view and FIG. 2 a vertical side view of a retractable thruster unit in accordance with an exemplary embodiment of the present disclosure. Reference numerals 2 refer to a lower support structure provided in connection with or as a part of the hull of a marine vessel in general, and reference numeral 4 to an upper support structure provided in connection with or as a part of the hull.

The thruster unit 10 illustrated in FIGS. 1 and 2 includes an electric motor 12 arranged on a motor base 14, a drive shaft housing 16 surrounding the drive shaft (not shown) extending from the electric motor 12 or the motor base 14 to the pod (not shown) arranged to the lower end of the drive shaft housing 16. The drive shaft housing 16 is a tube filled with either air or oil, which gives the housing a supportive property resulting, sometimes, in full buoyancy of the thruster unit, i.e. the thruster unit, while being lowered at its operating position, tending to move upwards on its own.

The motor base 14 is provided, in this exemplary embodiment of the present disclosure, with two arms 18 and 20 extending outwardly on opposite sides of the motor base 14. The arms 18 and 20 are, for example but not necessarily, at their outer ends opposite the motor base 14, each provided with a slide bearing 22 arranged to slide along a vertical guide post 24 when moving the thruster unit 10 up and down. The guide post 24 is fastened at both of its ends to the support structures 2 and 4. The arms 18 and 20 are each provided with a lifting nut 26 for cooperation with a spindle 28 arranged vertically between the support structures 2 and 4. The bearing 22 and the lifting nut 26 may be arranged directly to the arms 18 and 20, or, optionally, the arms may be provided with upper and lower support plates, 30' and 30", respectively, between which the bearing 22 and the lifting nut 26 are arranged.

FIGS. 1 and 2 show further an electric motor (a hydraulic motor will also do) 32 provided at the level of the lower (shown) or upper ends of the spindles 28 for rotating the spindles 28 in a desired direction. The motor 32 is provided with two drive shafts 34' and 34" extending from the motor to angular reduction gears 36 arranged here at the lower ends of the spindles 28. As already mentioned, the electric motor with its drive shafts and angular reduction gears may also be arranged, if desired to the level of the upper ends of the spindles. Both the electric motor and the angular reduction gears are fastened to the support structures of the marine vessel.

FIGS. 1 and 2 also show by references numerals 40 and 70 the lower and upper assemblies for supporting the spindle 28 to the lower and upper support structures 2 and 4.

Figure 3:
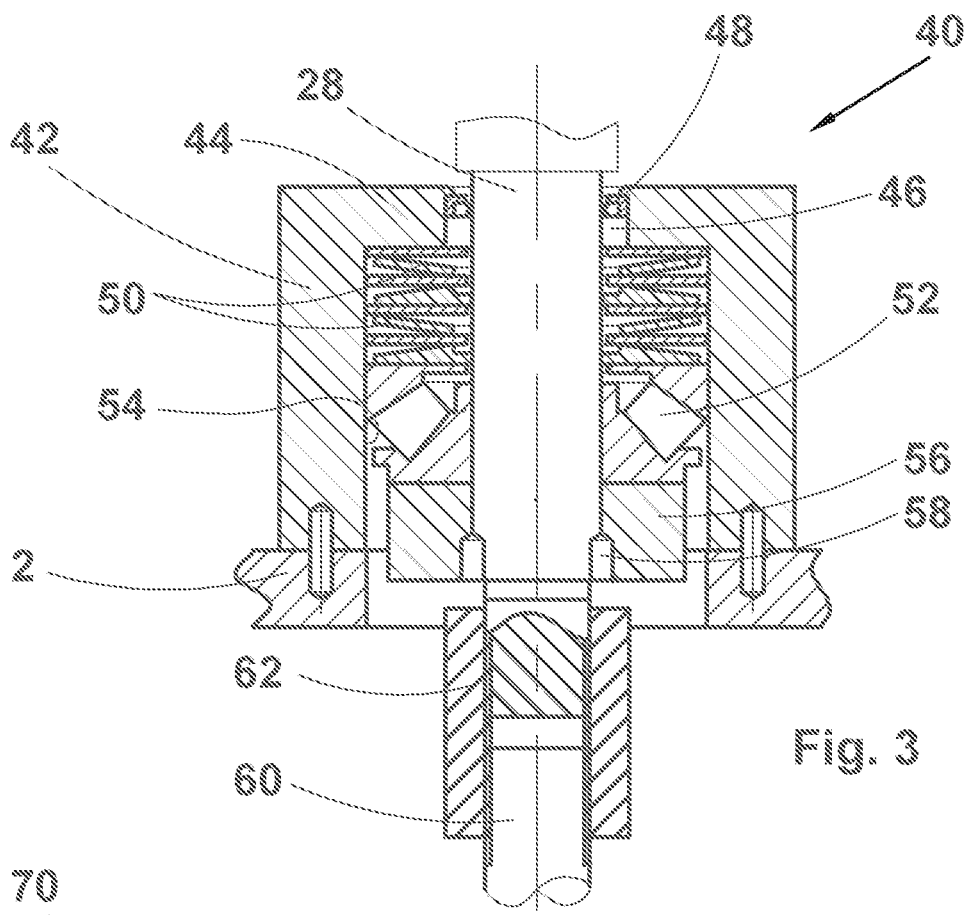
FIG. 3 illustrates an axial cross section of an exemplary attachment of a lower end of a spindle to support structures in a marine vessel in accordance with an exemplary embodiment of the present disclosure.

FIG. 3 illustrates an axial cross section of the lower support assembly 40 for supporting the lower end of the spindle 28 to the lower support structure 2 of a marine vessel. In this exemplary embodiment of the present disclosure the lower support structure 2 is provided with the support assembly 40 having a lower casing 42, which is, at its top 44, provided with an opening 46 for the spindle 28 and at its open end (lower end in the drawing) means for fastening the lower casing 42 to the lower support structure 2 of the marine vessel. The fastening means (not shown) may, for instance, be a flange provided round the (lower) open end of the lower casing 42 and a set of screws threaded through holes in the flange to threaded holes in the lower support structure 2. The opening 46 at the top 44 of the lower casing 42 is provided with a sealing ring 48, the lip of the sealing ring 48 communicating with the surface of the spindle 28 for retaining the grease or oil within the lower casing 42.

When installing the spindle 28, or in general the thruster unit, in place, the lower end of the spindle 28 is pushed through the sealing ring 48 inside the lower casing 42, a set of disc springs 50 is positioned on the spindle 28 and against the bottom 44 of the casing 42. Next a bearing 52, such as a tapered roller bearing or a thrust ball bearing is positioned on the spindle 28 for carrying and centering the spindle 28 in relation to the inner wall 54 of the lower casing 42. The threaded end section of the spindle 28 is provided with a locking nut 56 for keeping the bearing and the set of disc springs in place on the spindle. The loosening of the locking nut 56 is prevented by means of one or more locking pins, keys or screws 58 positioned, for instance, at the interface between the spindle 28 and the locking nut 56.

The coupling of the spindle 28 to the shaft 60 of the angular reduction gear (reference numeral 36 in FIG. 2) is performed by means of both the outer surface of the shaft 60 of the angular reduction gear, the outer surface of the lower end of the spindle 28 and the inner surface of the coupling sleeve 62 arranged thereon having keyways for one or more keys. Another exemplary alternative is to provide both the spindle 28 and the shaft 60 of the angular reduction gear with splined ends with a splined coupling sleeve or bushing 62 provided thereon.

Figure 4:
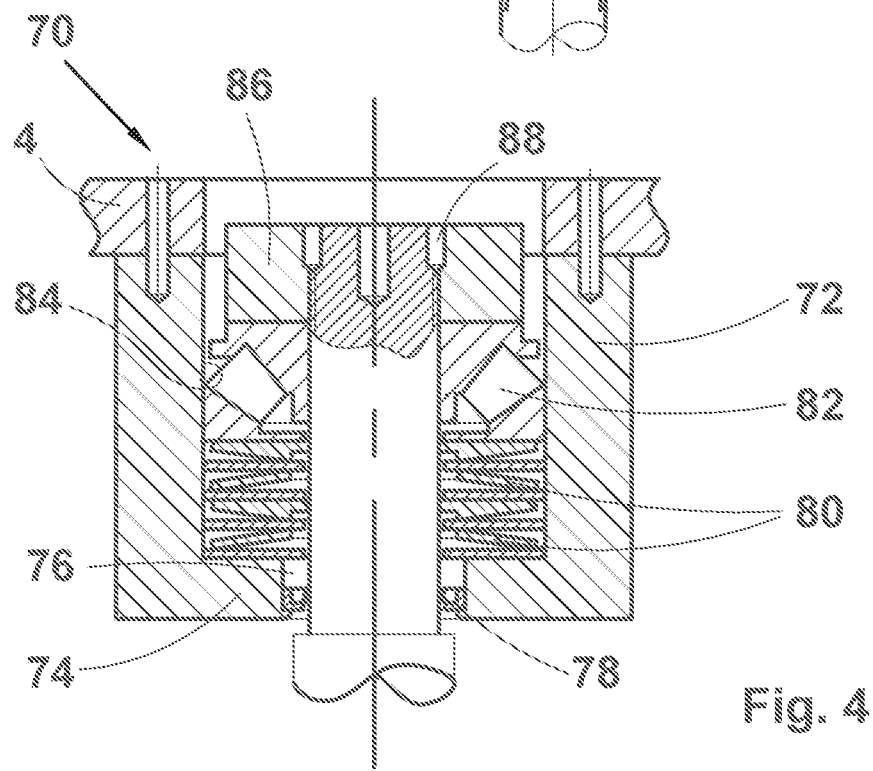
FIG. 4 illustrates an axial cross section of an exemplary attachment of an upper end of the spindle to the support structures in a marine vessel in accordance with an exemplary embodiment of the present disclosure.

FIG. 4 illustrates an axial cross section of the upper support assembly 70 for supporting the upper end of the spindle 28 to the upper support structure 4 of a marine vessel. In this exemplary embodiment of the present disclosure the upper support structure 4 is provided with the upper support assembly 70 having an upper casing 72, which is, at its bottom 74, provided with an opening 76 for the spindle 28 and at its open end (upper end in the drawing) means for fastening the upper casing 72 to the upper support structure 4 of the marine vessel. The fastening means (not shown) may, for instance, be a flange provided round the (upper) open end of the upper casing 72 and a set of screws threaded through holes in the flange to threaded holes in the upper support structure 4. The opening 76 is provided with a sealing ring 78, the lip of the sealing ring 78 communicating with the surface of the spindle 28.

When assembling the upper support assembly the upper casing 72 is first provided with the sealing ring 78 in the opening 76 whereafter the upper casing 72 is installed at the upper end of the spindle 28 by pushing the upper casing 72 downwards such that the upper end of the spindle is inside the sealing 78. Thereafter a set of disc springs 80 is positioned on the spindle 28 and against the bottom 74 of the upper casing 72. Next a bearing 82, such as a tapered roller bearing or a thrust ball bearing is positioned on the spindle 28 for carrying and centering the spindle 28 in relation to the inner wall 84 of the upper casing 72. The threaded upper end of the spindle 28 is provided with a locking nut 86 by means of which the sets of cup springs 50 and 80, both at the upper and lower ends of the spindle 28, are compressed to a desired tightness, when installing the thruster unit in place in the hull of a marine vessel. When the desired tightness is reached the loosening of the locking nut 86 is prevented, for instance, by means of one or more locking pins, keys or screws 88 positioned at the interface between the spindle 28 and the locking nut 86. Thereafter, a fastening plate 4 (earlier referred to as a support structure) is provided so that the upper casing 72 and the upper end of the guide post 24 (if used) may be fastened thereto, whereafter the fastening plate may be attached to other support structures of the marine vessel.

As may be understood in FIG. 4 the assembly of the set of disc springs 80, the bearing 82 and the locking nut 86 may be performed also after the fastening of the upper casing 72 to the fastening plate as the fastening plate is provided with a hole, which may be utilised in the assembly of the above mentioned elements, in tightening the locking nut 86 to provide a desired pre-tension in the spindle 28 and in allowing the axial movement of the upper end of the spindle 28 in the hole.

Referring to FIGS. 1-4, the installation or mounting of the thruster unit in the marine vessel takes place, in accordance with an exemplary method, as follows. First, the electric motor 32, the drive shafts 34' and 34" and the angular reduction gears 36 are fastened to the lower support structure 2. Secondly, the coupling sleeves 62 are inserted on the ends of the shafts 60 of the angular reduction gears 36. Thirdly, the lower support assemblies 40 are assembled as already discussed in connection with the lower ends of the spindles 28, and the support assemblies 40 are fastened to the lower support structure 2 such that the lower end of the spindle 28 is aligned inside the coupling sleeve 62. Next, the lower support structure 2 is provided with the guide posts 24, if used. While being erected upwardly the spindles 28 and the guide posts 24 aid in positioning the thruster unit 10 in its correct location. When starting to lower the thruster unit 10, the guide posts 24 and the spindles 28 are inserted in their respective openings in the arms 18 and 20 or in the upper and lower support plates 30' and 30". The openings for the guide posts 24 are provided with the slide bearing 22 and the openings for the spindles are provided with the lifting nuts 26. If the arms 18 and 20 are provided with separate support plates 30' and 30" it is possible to assemble the slide bearings 22 and the lifting nuts 26 afterwards before the final assembly of the upper support assemblies 70 and the fastening thereof and the upper ends of the guide posts 24 to the upper support structure 4. After the openings in the arms 18 and 20 or in the upper and lower support plates 30' and 30" are provided with the guide posts 24 and the spindles 28, the upper support assemblies 70 may be assembled at the upper ends of the spindles 28 in the manner discussed in connection with FIG. 4.

When dimensioning the spindle 28 and/or the shaft 60 of the angular reduction gear 36 care has to be taken to leave a sufficient gap between the ends of the spindle 28 and the shaft 36 such that the spindle 28 may move downwards until the upper set of disc springs 80 is fully compressed. A similar free area for a longitudinal or axial movement has to be reserved in connection with the coupling sleeve 62 or bushing and the lower end of the spindle 26 and the end of the shaft 60 of the angular reduction gear 36, too. By providing the opening shown in FIG. 4, in the upper support structure 4 free axial movement of the upper end of the spindle 28 can be ensured in an upward direction. A similar opening in the lower support structure 2 (FIG. 3) allows free axial movement of the lower end of the spindle 28 in a downward direction.

Via the discussed support assemblies and by providing free area in longitudinal or axial direction at both longitudinal or axial ends of the spindle, the spindle is arranged to "float" on the support of the sets of disc springs such that the spindle is always pre-tensioned and no matter from which direction the spindle is subjected to a load the spindle is never subjected to the risk of buckling but a tensile stress. In other words, even if the locking nuts 56 and 86 at the ends of the spindle 28 are, in the embodiment illustrated in FIGS. 3 and 4, in a way between the lower and upper support structures 2 and 4 due to the casings 42 and 72 having a shape of a cup, the locking nuts 56 and 86 are functionally outside the support structures as their movement in a direction outside the support structures 2 and 4 is at either end free and non-obstructed. In other words, the lower locking member 56 is able to freely move in an axial direction downwards from the lower support structure 2 and the upper locking member 86 is able to freely move upwards from the upper support structure 4.

Figure 5:
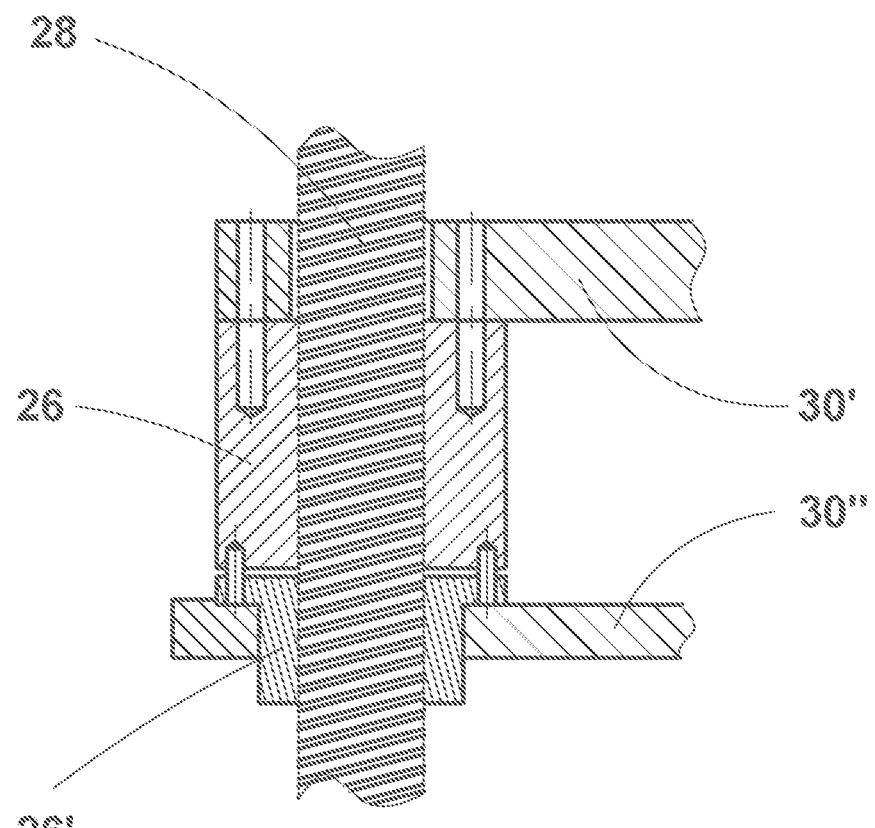
FIG. 5 illustrates a lifting nut arranged in communication with the spindle in accordance with an exemplary variation of the present disclosure.

FIG. 5 illustrates the lifting nut 26 arranged in connection with the upper and lower support plates 30' and 30" attached by arms to the motor base as shown in FIG. 2. In other words, the lifting nut 26 is, at its upper end, fixed to the upper support plate 30' and, at its lower end, to a safety nut 26'. The safety nut 26' is provided for ensuring that even if the thread in the lifting 26 nut fails, there is yet another nut preventing the support of the thruster unit from collapsing entirely.

FIGS. 6a, 6b and 6c illustrate schematically an exemplary operation of the spindle and the upper and lower support assemblies in different operating conditions. FIG. 6a illustrates a situation when the thruster unit does not subject any significant force to the spindle. The Figure shows how both disc spring sets 50 and 80 are slightly compressed such that the spindle 28 is pre-tensioned.

FIG. 6b shows a situation when the thruster unit subjects a force directed downwardly to the spindle. As a result the upper set 80 of disc springs is compressed and the lower set 50 of disc springs is retracted keeping the bearing 52 against the locking nut 56. Thus, it is evident that, due to the force the thruster unit subjects to the spindle, both upper and lower bearings (82 and 52) slide along the inner walls (84 and 54, see FIGS. 3 and 4) of the casings (42 and 72) until the upper set 80 of disc springs is fully compressed. The force the thruster unit subjects to the spindle is in each case the sum of the lift or buoyancy of the drive shaft housing, the force the movement of water subjects to the thruster unit, the weight or gravity of the thruster unit and the force subjected to the spindle when the thruster unit is moved up of down.

FIG. 6c shows a situation when the thruster unit subjects a force directed upwards to the spindle. The same function may be a result of buoyancy or motion of the marine vessel. In all such cases the lower set 50 of disc springs is compressed and the upper set 80 of disc springs is retracted keeping the bearing 82 against the locking nut 86. Thus, it is evident that, due to the force the thruster unit subjects to the spindle, both upper and lower bearings (82 and 52) slide along the inner walls (84 and 54, see FIGS. 3 and 4) of the casings (72 and 52) until the lower set 50 of disc springs is fully compressed.

It is thus clear that in exemplary embodiments the spindles are always under tensile stress irrespective of the direction of the load. In case of positive load due to gravity the lower support assembly allows the lower end of the spindle to move freely axially downwardly until the disc springs in the upper casing are fully compressed, in other words the load is hanging in the support of the upper support assembly and has induced tensile stress in the spindle. Here, the word 'freely' means a situation where the end of the spindle is free to move in a certain direction, i.e. the end of the spindle is not provided with any means preventing its movement in that particular direction. In other words, the opposite end of the spindle may have, and in this case has, means for limiting the movement of the end in question, but not the end itself. In case of negative loads due to external forces such as the motion of the marine vessel or buoyancy the upper support assembly allows the spindle to move freely axially upwardly until the disc springs in the lower casing are fully compressed. In other words, in all above discussed operating conditions the load subjected to the spindles results in tensile stress and there is not the slightest risk of buckling.

In view of the above it should also be understood that either the spindles may be driven with the lifting nuts fixed to the arms or support plates used for lifting the thruster unit, or the lifting nuts may be driven with the spindles fixed to the upper and lower support structures.

With regard to the locking nuts it should be understood that they may not only be threaded nuts screwed onto threaded end sections of a spindle but they may be locking members provided with some kind of bayonet-fastening cooperating with a corresponding fastening means at the end sections of the spindle. Additionally, the locking members may be locked in place with different types of wedge and (possibly circumferential) groove connections or by arranging a pin running radially through appropriate openings provided in both the locking member and the end section of the spindle.

As to the sets of disc springs they may be replaced with any such member that is resilient in the direction of the axis of the spindle including a set of coil springs or an annular ring of appropriate resilient material or a set of pads of appropriate resilient material like, for instance, rubber.

With regard to the coupling of the ends of the spindle to the lower and upper support structures, it is possible, as another exemplary embodiment of the present disclosure, that the ends of the spindle are brought through holes in the support structures, resilient members are positioned on the support round the ends of the spindle and locking members provided at the ends of the spindle to keep the resilient members between the locking members and the support structures. If desired bearings may be arranged between the locking members and the resilient members.

The lifting arrangement can include one or more spindles. In case of using more than 1 spindle, the synchronization between the spindles or lifting nuts may be achieved by various means and/or techniques, for example using synchronizing driveshaft or synchronizing chain, or using synchronous electric motors, using drive encoders and electronic compensation, etc. In a similar manner, various kinds of threaded rods and/or spindles may be used. For example, trapezoidal or other types of sliding threads, or ball & screw types of threads, which use a rolling connection instead of a sliding one can be used.

It should be understood that exemplary descriptions of novel and inventive retractable thruster units have been disclosed. It should be understood that though the specification discusses a certain type of a retractable thruster unit, the type of the retractable thruster unit does not limit the invention to the types discussed. The above explanation should not be understood as limiting the invention as the entire scope of the invention is defined by the appended claims only. From the description herein it should be understood that separate features may be used in connection with other separate features even if such a combination has not been specifically shown in the description or in the drawings.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A retractable thruster unit for a marine vessel having a hull, the retractable thruster unit comprising:
   a lifting spindle arrangement, the lifting spindle arrangement having a lifting spindle, a lifting nut, and a motor, and having a lower end and an upper end and being supported at its lower end to a lower support structure by a lower support assembly and at its upper end to an upper support structure by an upper support assembly, wherein one of the lifting spindle and the lifting nut is fixed and the other one is rotatable for moving the retractable thruster unit and the lifting nut is arranged in cooperation with the lifting spindle vertically between the upper support structure and the lower support structure; and
   a lower locking member provided at the lower end of the lifting spindle and an upper locking member provided at the upper end of the lifting spindle, the lower locking member being configured to freely move in an axial direction downwards from the lower support structure, and the upper locking member being configured to freely move upwards from the upper support structure, resulting in that in all operating conditions a load subjected to the lifting spindle is tensile stress.

2. The retractable thruster unit as recited in claim 1, comprising:
   a lower axially resilient member arranged at the lower end of the lifting spindle between the lower locking member and the lower support structure; and
   an upper axially resilient member arranged at the upper end of the lifting spindle between the upper locking member and the upper support structure.

3. The retractable thruster unit as recited in claim 2, comprising:
   at least one lower bearing arranged between the lower locking member and the lower axially resilient member; and
   at least one upper bearing arranged between the upper locking member and the upper axially resilient member.

4. The retractable thruster unit as recited in claim 3, wherein the at least one lower bearing or the at least one upper bearing is a tapered roller bearing or a thrust ball bearing.

5. The retractable thruster unit as recited in claim 2, comprising:
   a lower casing arranged in connection with the lower support structure, and an upper casing arranged in connection with the upper support structure.

6. The retractable thruster unit as recited in claim 5, wherein the lower casing houses the lower axially resilient member, and the upper casing houses the upper axially resilient member.

7. The retractable thruster unit as recited in claim 6, comprising:
   at least one lower bearing arranged in the lower casing between the lower locking member and the lower axially resilient member; and
   at least one upper bearing arranged in the upper casing between the upper locking member and the upper axially resilient member.

8. The retractable thruster unit as recited in claim 7, wherein the at least one lower bearing or the at least one upper bearing is a tapered roller bearing or a thrust ball bearing.

9. The retractable thruster unit as recited in claim 7, wherein:
   the lower casing includes a top;
   the upper casing includes a bottom;
   the lower axially resilient member is arranged on the top of the lower casing, the at least one lower bearing being provided on the lower axially resilient member, the lower locking member being provided on a threaded section of the spindle, the threaded section being against the at least one lower bearing; and
   the upper axially resilient member is arranged on the bottom of the upper casing, the at least one upper bearing being provided on the upper axially resilient member, the upper locking member being provided on a threaded section of the spindle, the threaded section being against the at least one upper bearing.

10. The retractable thruster unit as recited in claim 9, wherein the lower locking member or the upper locking member is a nut.

11. A marine vessel comprising:
    a hull; and at least one retractable thruster unit according to claim 9, wherein at least one of the lower support structure and the upper support structure is the hull of the marine vessel.

12. The retractable thruster unit as recited in claim 1, comprising:
at least one lower bearing arranged at the lower end of the lifting spindle between the lower locking member and the lower support structure; and
at least one upper bearing arranged at the upper end of the lifting spindle between the upper locking member and the upper support structure.

13. The retractable thruster unit as recited in claim 12, wherein the at least one lower bearing or the at least one upper bearing is a tapered roller bearing or a thrust ball bearing.

14. The retractable thruster unit as recited in claim 1, wherein at least one of the lower locking member and the upper locking member is a nut.

15. A marine vessel comprising:
a hull; and
at least one retractable thruster unit according to claim 1, wherein at least one of the lower support structure and the upper support structure is the hull of the marine vessel.

* * * * *